(12) United States Patent
Kim et al.

(10) Patent No.: US 10,003,281 B2
(45) Date of Patent: Jun. 19, 2018

(54) ELECTROSTATIC ENERGY HARVESTER WITH IMPROVED TRANSPARENCY AND MECHANICAL PROPERTY USING TWO-DIMENSIONAL MATERIAL ON FERROELECTRIC OR PIEZOELECTRIC MATERIAL

(71) Applicant: RESEARCH & BUSINESS FOUNDATION SUNGKYUNKWAN UNIVERSITY, Suwon-si (KR)

(72) Inventors: Sang Woo Kim, Yongin-si (KR); Seong Su Kim, Seoul (KR); Keun Young Lee, Suwon-si (KR); Han Joon Ryu, Daejeon (KR); Tae Yun Kim, Incheon (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 419 days.

(21) Appl. No.: 14/882,766

(22) Filed: Oct. 14, 2015

(65) Prior Publication Data

US 2016/0111978 A1     Apr. 21, 2016

(30) Foreign Application Priority Data

Oct. 15, 2014   (KR) .................. 10-2014-0138879

(51) Int. Cl.
*H02N 1/04* (2006.01)
*H04N 1/00* (2006.01)

(52) U.S. Cl.
CPC .................... *H02N 1/04* (2013.01)

(58) Field of Classification Search
CPC .. H02N 1/04; H02N 1/00; H02N 1/08; H02N 1/10; H02N 2/18; H01B 1/20
See application file for complete search history.

(56) References Cited

U.S. PATENT DOCUMENTS

| | | | | |
|---|---|---|---|---|
| 9,419,544 B2* | 8/2016 | Kim | ............... | H01L 41/113 |
| 9,571,009 B2* | 2/2017 | Wang | ............... | H02N 1/04 |
| 9,790,928 B2* | 10/2017 | Wang | ............... | F03G 5/06 |
| 9,843,275 B2* | 12/2017 | Wang | ............... | H02N 1/04 |
| 2013/0049531 A1* | 2/2013 | Wang | ............... | H02N 1/04 |
| | | | | 310/309 |
| 2014/0246950 A1* | 9/2014 | Wang | ............... | H02N 1/04 |
| | | | | 310/310 |
| 2015/0035408 A1* | 2/2015 | Despesse | ............... | H02N 1/08 |
| | | | | 310/310 |
| 2015/0061458 A1* | 3/2015 | Kageyama | ............... | H01G 7/02 |
| | | | | 310/309 |

(Continued)

FOREIGN PATENT DOCUMENTS

KR       10-1398708       5/2014

*Primary Examiner* — Edgardo San Martin
(74) *Attorney, Agent, or Firm* — NSIP Law

(57) ABSTRACT

A two-dimensionally structured material is transferred onto a ferroelectric or piezoelectric material layer, a property of the two-dimensionally structured material is controlled by poling performed on the ferroelectric or piezoelectric material to generate electric power generated by friction between the two-dimensionally structured material and a frictional charged material, and the electrostatic energy harvester has improved transparency and mechanical properties using the two-dimensionally structured material.

7 Claims, 4 Drawing Sheets

(56) References Cited

U.S. PATENT DOCUMENTS

| | | | |
|---|---|---|---|
| 2015/0194910 A1* | 7/2015 | Kim | H02N 2/18 |
| | | | 310/310 |
| 2015/0194911 A1* | 7/2015 | Kim | H02N 1/04 |
| | | | 310/310 |
| 2015/0194923 A1* | 7/2015 | Kim | H02S 10/10 |
| | | | 307/51 |
| 2016/0164434 A1* | 6/2016 | Kim | H02N 2/18 |
| | | | 310/310 |
| 2016/0285391 A1* | 9/2016 | Asanuma | H02N 1/08 |
| 2016/0315561 A1* | 10/2016 | Shin | H02N 1/04 |
| 2018/0013359 A1* | 1/2018 | Park | H02N 1/04 |
| 2018/0024668 A1* | 1/2018 | Byun | G06F 3/044 |

* cited by examiner

Negative poling

Positive poling

ELECTROSTATIC ENERGY HARVESTER WITH IMPROVED TRANSPARENCY AND MECHANICAL PROPERTY USING TWO-DIMENSIONAL MATERIAL ON FERROELECTRIC OR PIEZOELECTRIC MATERIAL

CROSS-REFERENCE TO RELATED APPLICATIONS

This application claims the benefit under 35 USC 119(a) of Korean Patent Application No. 10-2014-0138879, filed on Oct. 15, 2014, the entire disclosure of which is incorporated herein by reference for all purposes.

TECHNICAL FIELD

The present invention relates to an electrostatic energy harvester with improved transparency and mechanical properties using a two-dimensionally structured material, in which the two-dimensionally structured material is transferred onto a ferroelectric or piezoelectric material layer, a property of the two-dimensionally structured material is controlled by poling performed on the ferroelectric or piezoelectric material to generate electric power generated by friction between the two-dimensionally structured material and a frictional charged material.

BACKGROUND ART

In an electrostatic energy harvester which harvests energy using an electrostatic phenomenon generated by friction, the energy is generated due to a charge difference caused by electrostatic charges generated when two materials are in non-contact with each other after being in contact with each other.

The electrostatic energy harvester is referred to as an eco-friendly energy harvester having a new concept in which electricity energy can be infinitely extracted from consumable mechanical energy generated by fine vibration or movement of humans which exist everywhere, in contrast with conventional eco-friendly energy such as solar batteries, wind power, fuel cells, etc. An energy conversion method using the electrostatic property has high conversion efficiency, can be used for producing small and light products, and has been evaluated as new technology leading to a breakthrough technology leap and having great ripple effects through fusion of the energy conversion method and nanotechnology.

In conventional electrostatic energy harvesters, output of a device is generally determined based on a selection of a material depending on triboelectric series. Thus, research is mostly focused on a control of a device structure or a surface shape of the material rather than the selection of the material.

To overcome the above, the invention disclosed in Korea Patent Registration No. 10-1398708, which controls an electrostatic property generated by friction using electrical potentials generated by a ferroelectric property of a material, amplifies a charge difference of the material caused by the friction to constantly maintain the output of an electrostatic energy harvester, and thus the output thereof can be significantly improved, is suggested. The above invention is a patent made by the research staff of the present invention, and the output is improved by a selection of a material. However, a ferroelectric material is in direct contact with a frictional charged material, and a problem in that frictional heat damages the ferroelectric material occurs when the ferroelectric material is repeatedly in contact with the frictional charged material.

DISCLOSURE

Technical Problem

The present invention is directed to improving a mechanical property using a two-dimensionally structured material on a ferroelectric or piezoelectric material layer for preventing the damage caused by frictional heat generated by directly contacting the ferroelectric material described in the related art and a frictional charged material, and also improving transparency using the two-dimensionally structured material.

Technical Solution

One aspect of the present invention provides an electrostatic energy harvester with improved transparency and mechanical properties using a material having a two-dimensional structure on a ferroelectric or piezoelectric material layer includes a lower electrode; a first material layer disposed on the lower electrode; a second material layer disposed on the first material layer; a frictional charged material positioned above the second material layer, configured to repeat contacting and non-contacting the second material layer, and formed of a material having a charging property opposite a charging property of the first material layer; and an upper electrode disposed on the frictional charged material, wherein the first material layer includes a ferroelectric or piezoelectric material layer on which poling is performed, and the second material layer is the material having the two-dimensional structure, and frictional electricity is generated when the frictional charged material is changed to be in a non-contact state with the second material layer from a contact state therewith.

The first material layer may include a ferroelectric or piezoelectric material layer on which poling and thermal treatment are performed, the frictional charged material may include a transparent polymer material, and the lower electrode and the upper electrode may include transparent electrodes.

Positive or negative poling may be performed on the ferroelectric or piezoelectric material layer based on a charging property related to the frictional charged material.

Meanwhile, the electrostatic energy harvester may further include withdrawable parts respectively connected to the lower electrode and the upper electrode, wherein an energy storage part may be connected to the withdrawable parts, and rectifier diodes may be respectively connected between the withdrawable parts and the energy storage part.

Advantageous Effects

According to the present invention, a two-dimensionally structured material is transferred onto a ferroelectric or piezoelectric material layer, a property of the two-dimensionally structured material is controlled by poling performed on the ferroelectric or piezoelectric material to generate electric power generated by friction between the two-dimensionally structured material and a frictional charged material, and an electrostatic energy harvester, in which transparency and mechanical properties are improved, may be obtained by using the two-dimensionally structured material.

Exemplary embodiments of the present invention will be described in detail with reference to the accompanying drawings. It should be understood that the same signs throughout the drawings refer to the same elements. Particular specific contents are described in the following Modes of the Invention, which are intended to help overall understanding. However, it is apparent that the embodiments can be performed without these specific details. In the embodiments, well-known structures and devices are presented in block diagram form to easily explain the embodiments.

MODES OF THE INVENTION

Hereinafter, brief descriptions of one or more embodiments will be provided to provide a basic concept of the embodiment of the present invention. This section is not intended to provide a comprehensive concept with respect to all possible embodiments, and to distinguish core elements of all elements or to cover the scope of all embodiments. The only objective is providing a concept of one or more embodiments with simplified forms as the introduction of detailed descriptions which will be suggested below.

Figure 1:
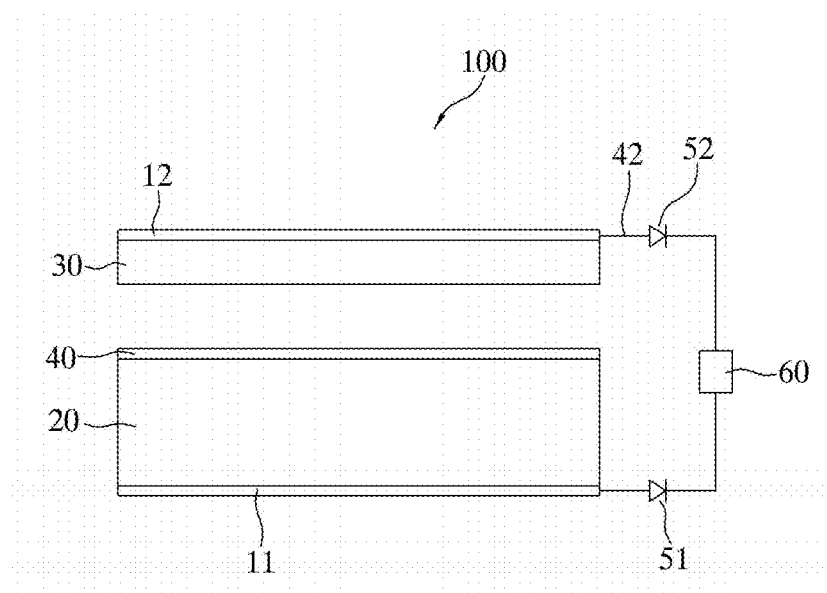
FIG. 1 is an aspect illustrating a side cross-sectional view of an electrostatic energy harvester according to one embodiment of the present invention.

FIG. 1 is an aspect illustrating a side cross-sectional view of an electrostatic energy harvester according to one embodiment of the present invention.

As shown in FIG. 1, an electrostatic energy harvester 100, in which transparency and mechanical properties are improved according to the embodiment of the present invention, includes a lower electrode 11, a first material layer 20 disposed on the lower electrode, a second material layer 40 disposed on the first material layer, a frictional charged material 30 disposed on the second material layer, and an upper electrode 12 disposed on the frictional charged material 30.

The first material layer 20 is a ferroelectric or piezoelectric material layer on which poling is performed. In the ferroelectric or piezoelectric material, since the polarities thereof may be arranged through poling, poling is performed. Both positive poling and negative poling may be performed on the ferroelectric or piezoelectric material, and this result may be determined with reference to FIGS. 2A and 2B.

In this case, poling of a certain polarity is determined based on a charging property of a frictional charged material (the property is based on a positive (+) or negative (−) polling process performed in relative relation with the frictional charged material and the ferroelectric or piezoelectric material).

A typical material of the ferroelectric or piezoelectric material includes PVDF, PZT, PTO, BTO, BFO, $KNbO_3$, $NaNbO_3$, GeTe, ZnO, $ZnSnO_3$, GaN, etc.

The second material layer 40 is a material having a two-dimensional structure, and a typical material includes graphene, BN, $MoS_2$, $MoSe_2$, $MoTe_2$, $WS_2$, $WSe_2$, $WTe_2$, etc. The material having the two-dimensional structure refers to a material having a two-dimensional structure such as graphene, i.e., having a structure in a flat shape.

The two-dimensionally structured material 40 is transferred onto and disposed on the ferroelectric or piezoelectric material used for the first material layer, and a property thereof is changed by a dipole based on poling on the ferroelectric or piezoelectric material. That is, since the two-dimensionally structured material is a thin layer such as an atomic layer, an amount of losing or obtaining electrons is changed by the dipole of the ferroelectric or piezoelectric material and the property thereof may be changed.

The two-dimensionally structured material may be grown by various well-known methods, e.g., CVD, etc., and in addition, may be transferred onto the ferroelectric or piezoelectric material through a transfer process. There are no specific limitations associated with the transfer method.

Meanwhile, since the two-dimensionally structured material has an excellent mechanical property and high transparency, when the material is used for an energy harvesting device of the present invention, improvement of the mechanical property and transparency thereof can be expected. A detailed description thereof will be additionally described below.

The frictional charged material 30 may repeat contacting and non-contacting the two-dimensionally structured material, and may be formed of a material having a charging property opposite a charging property of the first material layer 20 as the ferroelectric or piezoelectric material layer. The frictional charged material 30 is formed of a transparent polymer material, and the transparent polymer material refers to a polymer material by which transparency, i.e., light transmittance, may be secured. A typical example includes Teflon, nylon, PMMA, etc.

The frictional charged material 30 continuously repeats contacting and non-contacting the two-dimensionally structured material 40, and thus, frictional electricity is generated and electric power is generated.

Figure 2A:
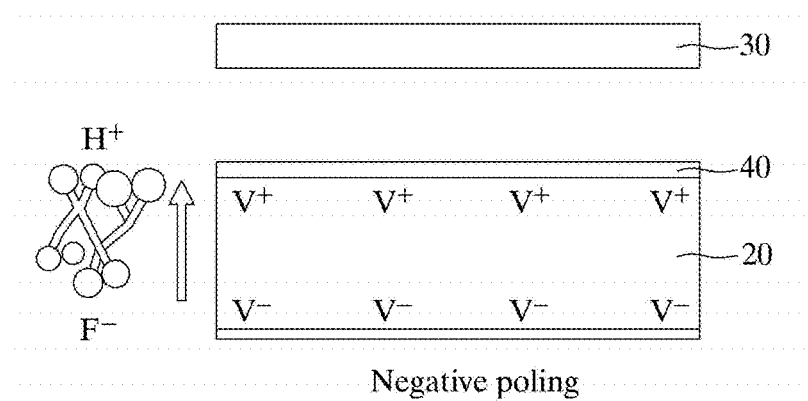
FIGS. 2A and 2B are aspects when negative poling and positive poling each are performed on an electrostatic energy harvester with a ferroelectric property according to one embodiment of the present invention.
Figure 2B:
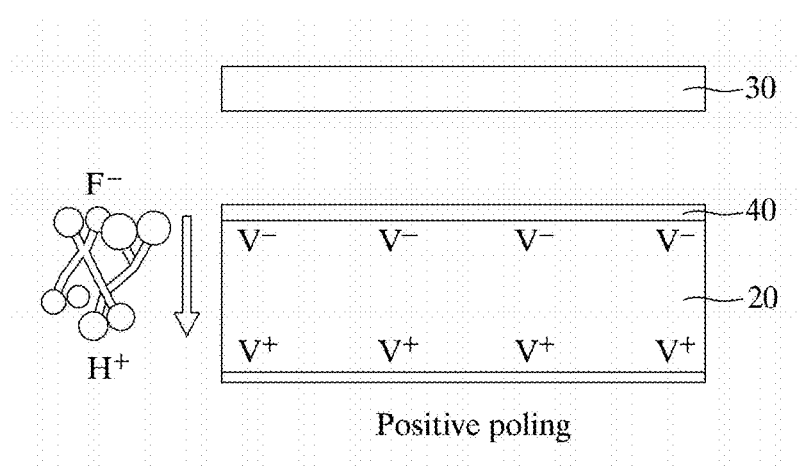

FIGS. 2A and 2B are aspects when negative poling and positive poling each are performed on an electrostatic energy harvester with a ferroelectric property according to one embodiment of the present invention.

Referring to FIGS. 2A and 2B, PVDF-TrFE, which is an example of the ferroelectric or piezoelectric material, is used for the first material layer 20, graphene is used for the second material layer 40, and Teflon is used for the frictional charged material 30.

When negative poling is performed on the first material layer formed of PVDF-TrFE, $V^+$ charges are arranged toward the frictional charged material inside the first material layer as the aspect shown in FIG. 2A, and when positive poling is performed, $V^−$ charges are arranged toward the frictional charged material inside the first material layer as the aspect shown in FIG. 2B.

In this case, PVDF-TrFE has a negative charging property and Teflon has a positive charging property in the relation between PVDF-TrFE and Teflon. Accordingly, Teflon loses electrons in relative relation with PVDF-TrFE, and thus, when negative poling is performed on PVDF-TrFE, output values of a voltage and a current generated by frictional electricity may be great. That is, the ferroelectric or piezoelectric material layer may selectively perform positive or negative poling based on a charging property related to the frictional charged material to generate a great output value.

Figure 4A:
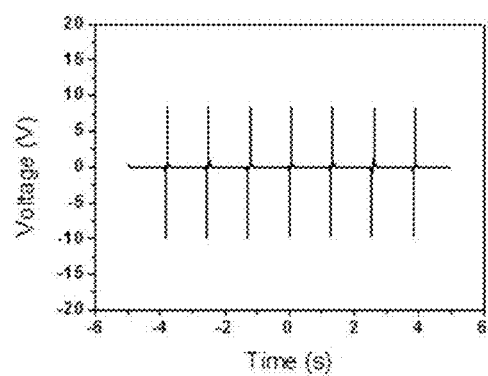
FIGS. 4A to 4C are graphs illustrating the output of an electrostatic energy harvester according to one embodiment of the present invention.
Figure 4B:
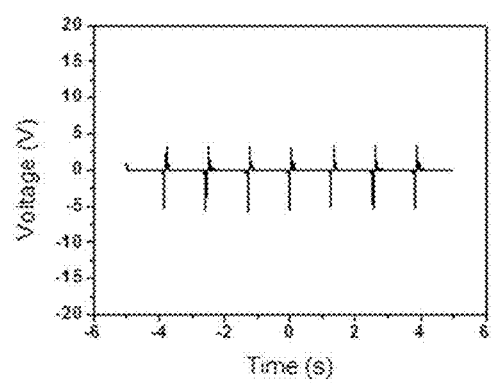
Figure 4C:
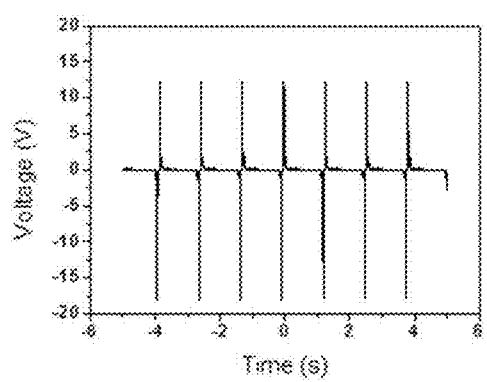

As shown in FIG. 4C, when negative poling is performed, it may be determined that a peak voltage is the greatest. When experimental examples are described below, FIGS. 4A to 4C will be described again.

The lower electrode 11 and the upper electrode 12 may be formed of any electrode material by which transparency may be secured and a typical material includes ITO, etc.

In the embodiment of the present invention, while a two-dimensionally structured material on the charged ferroelectric or piezoelectric material repeats contacting and non-contacting the frictional charged material, frictional electricity is generated. Thus, since a material in direct contact with the frictional charged material is not a ferroelectric material described in the related art, a problem, in that frictional heat damages the ferroelectric material when the ferroelectric material is repeatedly in contact with the frictional charged material, is solved. This is caused by an excellent mechanical property of the two-dimensionally structured material. In addition, since the two-dimensionally structured material is used, transparency thereof can also be secured.

Meanwhile, a material, on which poling and thermal treatment are performed, may be used for the ferroelectric or piezoelectric material layer as the first material layer.

PVDF-TrFE, which is one example of the ferroelectric or piezoelectric material, mainly is alpha-phase before a thermal process is performed and the strength of a dipole thereof is weak. However, after the thermal process is performed at 140° C., the state becomes more beta-phase and the strength of the dipole has become strong. However, when the thermal process is only performed, the ferroelectric material is in a state in which the dipole thereof is not set yet, and thus, an output value thereof is small because the dipole randomly influences the two-dimensionally structured material disposed on the ferroelectric material. Accordingly, when a direction of the dipole of the ferroelectric material is set through poling after the thermal process is performed, the dipole influences the two-dimensionally structured material in a constant direction. As shown in FIGS. 4A, 4B, and 4C, when a thermal process is performed as shown in FIG. 4B, output peaks are small because the dipole is not set yet, and it may be determined that the output peaks are great after poling is performed as shown in FIG. 4C.

In summary, a material, on which poling and thermal treatment are performed, may be used for the ferroelectric or piezoelectric material layer as the first material layer. In this case, an additional effect, in which the strength of the dipole thereof can be strong through the thermal process, may be obtained.

Meanwhile, withdrawable parts 42 respectively connected to the lower electrode 11 and the upper electrode 12 may be additionally included as shown in FIG. 1 to be used in an energy harvester. An energy storage part 60, such as a storage battery, is connected to the withdrawable parts 42. Rectifier diodes 51 and 52 may be respectively connected between the withdrawable parts 42 and the energy storage part 60. A load may be connected to lead cable to directly turn on a bulb. Meanwhile, the diode is a rectifier diode, and thus, serves to flow a current in any one direction to prevent the storage battery 60 from discharging due to a reverse flow of the current.

Hereinafter, the present invention will further be described with reference to specific embodiments.

Figure 3:
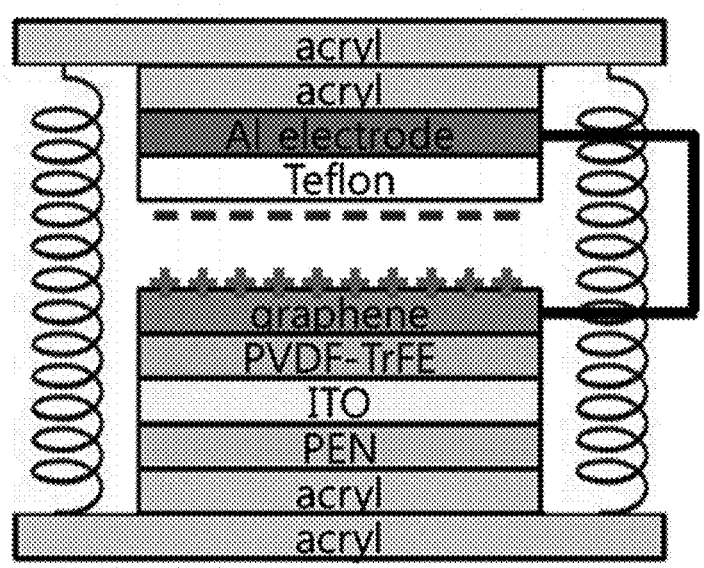
FIG. 3 is an experimental schematic diagram illustrating an electrostatic energy harvester according to one embodiment of the present invention.

FIG. 3 is an experimental schematic diagram illustrating an electrostatic energy harvester according to one embodiment of the present invention, and FIGS. 4A to 4C are graphs illustrating the output of an electrostatic energy harvester according to one embodiment of the present invention.

FIG. 3 is an experimental example when graphene, which is one of two-dimensionally structured materials, is transferred onto PVDF-TrFE as a ferroelectric material, and is an experiment to prove a change in a triboelectric property of the two-dimensionally structured material as an experimental basis. This structure is a simple example and the present invention is not limited to this sample.

As shown in FIG. 3, ITO is used for a lower electrode, PVDF-TrFE is used for the ferroelectric or piezoelectric material, graphene is used for the two-dimensionally structured material, and Teflon is used for a frictional charged material. Meanwhile, a pressable structure is formed through a spring structure, and graphene may contact or non-contact Teflon when a press is applied. This structure capable of allowing to be in a contact or non-contact state is a simple example, and the contact or non-contact state may be made by various manners such as bending, sliding, pushing, etc.

The experimental result of FIG. 3 is illustrated in FIGS. 4A to 4C. FIG. 4A shows output peaks in a state in which any process is not performed, FIG. 4B shows output peaks when a thermal process is performed on PVDF-TrFE at 140° C., and FIG. 4C shows output peaks when thermal treatment and negative poling are performed. As described above, the strength of the dipole of the ferroelectric or piezoelectric material may become strong by the thermal process. However, since the dipole is not set when the thermal treatment is only performed, the effect of the dipole does not appear, and the output peaks are increased when poling is performed by a poling process.

In this case, poling is determined based on charging properties of the frictional charged material and the ferroelectric or piezoelectric material. When Teflon is used as the frictional charged material, output values are the greatest when negative poling is performed on the ferroelectric or piezoelectric material. Because PVDF-TrFE has a negative charging property and Teflon has a positive charging property in the relation between PVDF-TrFE and Teflon. As determined in FIG. 4C, it may be determined that the output peaks are greatly increased after the negative poling process is performed.

As described above, according to the embodiment of the present invention, the two-dimensionally structured material is transferred onto the ferroelectric or piezoelectric material layer, a property of the two-dimensionally structured material is controlled by poling performed on the ferroelectric or piezoelectric material to generate electric power generated by friction between the two-dimensionally structured material and the frictional charged material, and the electrostatic energy harvester, in which transparency and mechanical properties are improved, may be obtained by using the two-dimensionally structured material.

While the present invention has been particularly described with reference to exemplary embodiments, it will be understood by those of skilled in the art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims.

The invention claimed is:

1. An electrostatic energy harvester with improved transparency and mechanical properties using a material having a two-dimensional structure on a ferroelectric or piezoelectric material layer, comprising:
    a lower electrode;
    a first material layer disposed on the lower electrode;
    a second material layer disposed on the first material layer;
    a frictional charged material positioned above the second material layer, configured to repeat contacting and non-contacting the second material layer, and formed of a material having a charging property opposite a charging property of the first material layer; and
    an upper electrode disposed on the frictional charged material,
    wherein the first material layer includes a ferroelectric or piezoelectric material layer on which poling is performed, and the second material layer is the material having the two-dimensional structure, and frictional electricity is generated when the frictional charged material is changed to a non-contact state with the second material layer from a contact state therewith.

2. The electrostatic energy harvester of claim 1, wherein the first material layer includes a ferroelectric or piezoelectric material layer on which poling and thermal treatment are performed.

3. The electrostatic energy harvester of claim 1, wherein the frictional charged material includes a transparent polymer material.

4. The electrostatic energy harvester of claim 1, wherein the lower electrode and the upper electrode include transparent electrodes.

5. The electrostatic energy harvester of claim 1, wherein positive or negative poling is performed on the ferroelectric or piezoelectric material layer based on a charging property related to the frictional charged material.

6. The electrostatic energy harvester of claim 1, further comprising withdrawable parts respectively connected to the lower electrode and the upper electrode, wherein an energy storage part is connected to the withdrawable parts.

7. The electrostatic energy harvester of claim 1, wherein rectifier diodes are respectively connected between the withdrawable parts and the energy storage part.

* * * * *